United States Patent

[11] 3,625,182

[72] Inventors Earl Pierce Williams
Pen Argyl;
Nathan David Field, Allentown, both of Pa.
[21] Appl. No. 31,378
[22] Filed Apr. 23, 1970
[45] Patented Dec. 7, 1971
[73] Assignee GAF Corporation
New York, N.Y.

[54] TREATMENT OF WATER IN FISH HATCHERY REARING PONDS
4 Claims, No Drawings
[52] U.S. Cl. ................................................. 119/3,
210/24
[51] Int. Cl. ............................................ A01k 63/00
[50] Field of Search ........................................ 119/3.5;
210/24; 260/2.5 N, 2.5 P

[56] References Cited
UNITED STATES PATENTS

| | | | |
|---|---|---|---|
| 1,393,339 | 10/1921 | Benton ...................... | 119/5 |
| 3,110,285 | 11/1963 | Greenough ................ | 119/3 |
| 3,398,092 | 8/1968 | Fields et al. ................ | 210/24 X |
| 3,492,223 | 1/1970 | Walles ........................ | 210/24 |

*Primary Examiner*—Samih N. Zaharna
*Attorneys*—Samson B. Leavitt and Walter C. Kehm ABSTRACT: A method of treating waters so as to render the same suitable for rearing trout fry and similar fry of fresh water fish comprising passing the waters through and in contact with a porous granular or porous bead form of a water-insoluble, cross-linked vinylpyrrolidone polymer.

TREATMENT OF WATER IN FISH HATCHERY REARING PONDS

The present invention is directed to a method a of treating water, particularly water to be used for rearing trout fry and similar fish; more particularly, the present invention is directed to a method of treating such water wherein the water is passed through and in contact with a porous granular or porous bead form of a cross-linked water-insoluble vinylpyrolidone polymer.

Many trout hatcheries have a severe problem with respect to available water supply in which trout fry can be raised during the first few months after emergence from the egg, i.e., within the stages of sac fry and fry. This is especially true when the water used to raise the trout fry during such first few months is taken directly from certain types of wells. In this regard routine chemical analyses of such water usually indicate nothing irregular and the exact morbid agents in the water causing the observed high mortality in the fry stage is not precisely determinable.

For some time, there has been a need for a method of treating the water used for raising trout fry and other hatchery fry which would eliminate the morbidity associated with water that brings about the high mortality rate. This has now been accomplished in accordance with the present invention.

The present invention is based on the discovery that disadvantages or morbid agents associated with well waters now currently employed in commercial fish hatcheries for the raising of trout fry and similar fry can be eliminated by a treating of the problem waters by passing them through and in contact with a porous granular or porous bead form of a water-insoluble, cross-linked vinylpyrrolidone polymer.

Accordingly, it is a principal object of the present invention to provide a process for treating well waters useful in hatcheries in raising trout fry and similar fry which process eliminates the observed toxicity of some well waters when used for this purpose.

It is a further object of the present invention to provide a process by which the mortality rate of trout and similar fry can be reduced by treating the waters in which such fish are raised by percolating the waters through and in contact with a porous granular or porous bead form of a water-insoluble, cross-linked vinylpyrrolidone polymer.

Still further objects and advantages of the novel process of the present invention will become more apparent from the following more detailed description thereof.

The above advantages of the novel process of the present invention are achieved by treating the waters in which trout or similar fry are to be raised with a porous granular or porous bead form of a water-insoluble, cross-linked vinylpyrrolidone polymer. In this regard the present invention is particularly applicable to the treatment of waters from artesian wells in wooded areas. Some such waters are known to cause a mortality rate of about 100 percent in fry within seven to 10 days. It is believed that the morbid qualities of such waters result from the passage of the water through the accumulated layers of leaf mulch from which some material toxic to the fry is leached. Peculiarly enough, such waters are toxic only during the fry stage, when the fish are at the fingerling stage, above about 2 inches in length for trout, they are no longer sensitive to the unknown morbid agents. Well water however, is preferred for hatcheries as its temperature is in the preferred range and the mineral content is usually properly balanced. Surface waters while nonmorbid in this respect are at optimism temperature during only short periods of the year and are prone to other pollutants.

The porous granular or porous bead forms of the cross-linked vinylpyrrolidone polymer utilized in accordance with the process of the present invention are disclosed in copending application, Ser. No. 736,302 in the names of Nathan D. Field and Earl P. Williams now abandoned. In this copending application, the subject matter of which is incorporated herein by reference, discloses and claims a method of producing a porous granular or porous bead form of a water-insoluble, cross-linked vinylpyrrolidone polymer. In this regard such a polymer product is produced from a suspension polymerization of a monomeric vinylpyrrolidone monomer, optionally with one or more copolymerizable monomer or monomers, and a cross-linking agent in an aqueous solution of an electrolyte, the suspension being maintained during polymerization by mechanical agitation. Such polymerization capable of producing the porous granular or porous bead from of the vinylpyrrolidone polymer employed in accordance with the present invention preferably utilizes a free radical polymerization source, i.e., free radical polymerization catalyst.

As defined in such copending application such a suitable vinylpyrrolidone polymer in a porous granular or porous bead form is produced by the polymerization of the vinylpyrrolidone monomer with from 0.1 to 20 percent by weight of a di- or polyfunctional cross-linking agent. The porous water-insoluble cross-linked granular or bead vinylpyrrolidone polymers so formed by the suspension polymerization process preferable for use in this invention are those which have a diameter of from about 1 mm. to about 7 mm. Optionally, such polymers contain up to 50 percent by weight of a further copolymerizable monomer, based upon the weight of the vinylpyrrolidone. For a further discussion of such polymers per se and the method by which the same are produced, reference is made to U.S. application, Ser. No. 736,302, filed June 12, 1968, now abandoned.

In carrying out the process of the present invention the water to be used to raise the trout fry and similar fish is sprayed upon and passed through a bed comprising the porous granular or porous bead form of the vinylpyrrolidione polymer. In this regard the amount of polymer through which the water percolates in accordance with the present invention is not critical as long as the water does come in good contact with the porous polymeric granules that any components in the water tending to have an adverse effect upon the life of the fry is removed, freed or in some manner decontaminated. In this regard the method by which the process of the present invention is capable of treating the water so as to provide an environment in which the fish can live and grow is only hypothetical in that the materials present in the water tending to destroy the fish have not been isolated and are of an unknown nature.

With regard to the process of the present invention it has been found under certain circumstances to be advantageous to pass water into contact with the porous granular or porous bead form of vinylpyrrolidone polymer by more than one pass or stage, i.e., by passing the water down through a column having a series of perforated trays containing and supporting the polymeric granules. In this way it is possible to ensure that all the water comes in contact with the active polymer so as to provide the results associated with the process of the present invention.

While the above discussion has been presented primarily with respect to the treatment of morbid well waters in which fry will be raised, it is important to point out that the process of the present invention is applicable generally to waters in which any and all similar and related fish thrive and for other stages in the art of fish husbandry. In this regard the process of the present invention is not limited to the treatment of morbid water for the raising of trout but is applicable to the treatment of water generally in which any freshwater fish will be raised. Thus, for example, waters so treated may be used for raising any and all hatchery stages of the freshwater trout, large and small mouth bass, perch and similar fish.

The process of the present invention will now be described by reference to the following specific examples.

EXAMPLE 1

Preparation of Porous Polymer Beads

The following materials were charged to a 2-gallon stainless steel stirred autoclave:

6.93 g. azobisisobuytronitrile (DuPont-Vazo) previously dissolved in
660.0 g. vinylpyrrolidone (VPC analysis 99.7 percent pure)
33.0 g. Dow divinylbenzene mixture 50–60 (assay 55 percent)
2,150.0 g. distilled water
570.0 g. anhydrous sodium sulfate (Bakers Reagent Grade)

The autoclave was purged of air by applying vacuum to 25 mm. The vacuum was then released with nitrogen and the procedure repeated two more times. The materials were heated with stirring (210 r.p.m. 4 blade turbine) to 65° C. over a period of 1½ hours and held for 4 hours at 65° C. (p.s.i.g. 2 to 5). 5). temperature was then raised to 85° C. over a period of 1 hour and held at 85° C. for 2 hours longer (p.s.i.g. 10 to 12).

The reaction product was cooled to 75° C. and 950 ml. technical ethanol added and stirred for ½ hour, then transferred to a Buchner funnel and washed with distilled water until a portion of the filtrate tested with a few mls. of saturated $BaCl_2$ solution was found to be less turbid than a $BaCl_2$ control test with tap water.

After allowing the excess water to drain off, the wet beads weighed 2,998 grams.

A 100 g. portion of wet beads was dried in a high vacuum over at 65°–70° C. The dried beads weighed 20.2 grams (20 percent solids).

EXAMPLE 2

The porous polymer beads produced in example 1 were utilized to treat the water from an artesian well. A chemical analysis of the water collected from the artesian well prior to treatment in accordance with the present invention resulted in the following:

| | | |
|---|---|---|
| pH | = 6.2 | |
| color | = 5 | |
| turbidity | 0.0 | |
| temperature exhaustion = | 46° F. | |
| methyl orange alkalinity | = 18.0 | p.p.m. |
| chlorides | = 1.0 | p.p.m. |
| $NH_3$ | = 0.000 | p.p.m. |
| nitrites | = 0.000 | p.p.m. |
| nitrates | = 0.25 | p.p.m. |
| copper | = <0.1 | p.p.m. |
| sulfides | = 0.0 | p.p.m. |
| iron | = <0.1 | p.p.m. |
| sodium | = <0.1 | p.p.m. |
| boron | = <0.1 | p.p.m. |
| methane | = <1.0 | p.p.m. |
| calcium hardness | = 28.0 | p.p.m. |
| total hardness | = 43.0 | p.p.m. |

A musty odor was noted to be present in this water, presumably due to the percolation of the water through the forest leaf mulch from the forests surrounding the artesian well.

Water from the artesian well was passed at a rate of 1 gallon per minute into the top of an open sides vertical tower containing a layered series of trays spaced 8 inches apart. The top tray (18 inches long, 12 inches wide, 4 inches deep), was perforated with ⅛inch holes spaced evenly at ½inch intervals over the entire bottom surface of the tray. This allowed the steady stream of water to be converted into a shower of water having the same length and width as the trays below. The second tray (18 inches long, 12 inches wide, 4 inches deep), situated 8 inches below the top tray, had an aluminum wire screen bottom (mesh size=18 holes per inch). This tray contained 2½ lbs. of the polymer beads (½lb. polymer beads on 100 percent solids basis) spread evenly over the aluminum wire screen. The shower of water percolated through these polymeric beads down to a third tray constructed similarly to tray number two and also contained 2½ lbs. of polymer beads (½lb. on 100 percent solids basis). The effluent water from the third tray was directed into a rearing trough 50 inches long, 7 inches wide, and 5 inches deep containing 300 brook trout (Salvelinus fontinalis) passing from the sac fry to the fry stage of development. The experiment was conducted or a period of three months during which time 36 trout had died.

In control experiments conducted with the same family of brook trout of similar stage of development and using the same showering equipment except for omitting the polymer beads, all of the trout had died in seven days in the first control test and all had dies in ten days in a second control test.

The above example was replicated in 40 rearing troughs with similar success (less than 2 percent mortality) during successive years. The runoff from the fry troughs was led to the fingerling tanks with no significant effect noted there. During successive years the raw water from the well was tested and found to be morbid to the fry.

During the course of the test the polymer granules in the percolating towers were usually replaced at 3 month intervals i.e., with each batch of new fry. There was no indication however of any loss of capacity for freeing the water from morbidity. In one trough where the granules were not changed during the two fry-cycles no increase in mortality was noted. During normal operation approximately 130,000 – 150,000 gallons of water were rendered nonmorbid by about 1.0 lb. of granules (on a dry basis) during the regular 3 month fry cycle.

While exhaustion of the polymer in its capacity to remove morbidity from well waters had not been noted, it is known that the general absorptive capacity of the polymer granules can be revived by an alkaline regeneration process.

I claim:

1. In fish husbandry, the method of raising fry is well water morbid to said fry but otherwise nontoxic to fish, which comprises the step of contacting the morbid well water with water-insoluble, porous cross-linked vinylpyrrolidone polymer particles to free the morbidity from the water and then supplying the water as a growth medium for the fry wherein said vinylpyrrolidone polymer is cross-linked to the extent of from 0.1 –20 percent by weight with a cross-linking agent.

2. The method according to claim 1 wherein the contacting step includes percolating of the water through at least one bed of said polymer particles.

3. The method according to claim 2 wherein the water is sprayed over the bed of the polymer particles.

4. The method according to claim 3 wherein the water is sprayed over at least the initial percolation bed of granules and is applied dropwise over the successive beds.

* * * * *